US009700018B2

(12) United States Patent
Vaccari

(10) Patent No.: US 9,700,018 B2
(45) Date of Patent: Jul. 11, 2017

(54) RETRACTABLE PET LEASH PROVIDED WITH A PROTECTIVE SHELL

(71) Applicant: FERPLAST S.P.A., Castelgomberto (IT)

(72) Inventor: Carlo Vaccari, Castelgomberto (IT)

(73) Assignee: FERPLAST S.P.A., Castelgomberto (IT)

( * ) Notice: Subject to any disclaimer, the term of this patent is extended or adjusted under 35 U.S.C. 154(b) by 16 days.

(21) Appl. No.: 14/413,957

(22) PCT Filed: Mar. 24, 2014

(86) PCT No.: PCT/EP2014/055809
§ 371 (c)(1),
(2) Date: Jan. 9, 2015

(87) PCT Pub. No.: WO2014/154618
PCT Pub. Date: Oct. 2, 2014

(65) Prior Publication Data
US 2015/0208614 A1    Jul. 30, 2015

(30) Foreign Application Priority Data

Mar. 29, 2013   (IT) .............................. VR2013A0077

(51) Int. Cl.
*A01K 27/00*        (2006.01)
(52) U.S. Cl.
CPC .......... *A01K 27/004* (2013.01); *A01K 27/006* (2013.01)

(58) Field of Classification Search
CPC .. A01K 27/004; A01K 27/006; A01K 27/008; A01K 27/003; A01K 27/005; A45F 5/004
(Continued)

(56) References Cited

U.S. PATENT DOCUMENTS 6,290,158 B1    9/2001  Huang
6,925,967 B1 *  8/2005  Woodruff ............. A01K 27/004
                                                    119/712
(Continued)

FOREIGN PATENT DOCUMENTS

EP          2095708 A2    9/2009

OTHER PUBLICATIONS

International Search Authority, Search Report for International Application PCT/EP2014/055809, May 26, 2014 (EPO), 2 pages, The Hague, Netherlands.

*Primary Examiner* — Patrick Hawn
(74) *Attorney, Agent, or Firm* — Ference & Associates LLC

(57) ABSTRACT

An automatically retractable pet leash, comprises a casing or guard (10) inside which is a winding device of a cord or ribbon that protrudes from the casing or guard (10) through an aperture (13), and a braking mechanism operated by a pushbutton (12), and also comprises a handle (11) for gripping the leash with one hand. It also comprises a protective shell (14) designed to protect the casing or guard (10) from knocks or blows that can damage it; the casing or guard comprises at least one housing designed to accommodate by snap-fitting, when used, at least one coupling or ribbing element foreseen on the body of the protective shell (14) in such a way as to hold the protective shell (14) locked against the casing or guard (10).

6 Claims, 1 Drawing Sheet

(58) Field of Classification Search
USPC .......................... 119/79, 795, 796, 797, 798
See application file for complete search history.

(56) References Cited

U.S. PATENT DOCUMENTS

| | | | | |
|---|---|---|---|---|
| 7,194,982 B2 * | 3/2007 | Edwards | ............ | A01K 27/004 |
| | | | | 119/796 |
| 7,367,286 B2 * | 5/2008 | Beaupre | ............ | A01K 27/006 |
| | | | | 119/792 |
| 8,347,825 B2 * | 1/2013 | Lopez | ............ | A01K 27/006 |
| | | | | 119/61.56 |
| 8,776,732 B2 * | 7/2014 | Bredesen | ............ | A01K 87/007 |
| | | | | 119/770 |
| 8,839,745 B1 * | 9/2014 | Johnston | ............ | A01K 27/003 |
| | | | | 119/769 |
| 2005/0172914 A1 * | 8/2005 | Woodruff | ............ | A01K 27/006 |
| | | | | 119/796 |
| 2006/0118062 A1 * | 6/2006 | Edwards | ............ | A01K 27/004 |
| | | | | 119/796 |
| 2011/0168829 A1 | 7/2011 | Okumura | | |
| 2011/0290188 A1 * | 12/2011 | Lopez | ............ | A01K 27/008 |
| | | | | 119/72 |
| 2012/0186539 A1 * | 7/2012 | Johnston | ............ | A01K 27/008 |
| | | | | 119/796 |

\* cited by examiner

RETRACTABLE PET LEASH PROVIDED WITH A PROTECTIVE SHELL

TECHNICAL FIELD

The present invention relates to a pet leash of the automatically retractable type fitted or not fitted means to block the extension of the cord or ribbon as required in order to allow the cord or ribbon to extend in an adjustable way up to a predetermined maximum distance, this leash being provided with a protective shell.

Whereas the retracting device relative to the application according to the invention can have any shape, any winding mechanism and any type of cord or ribbon, the present invention refers to a leash provided with a protective shell whose application on the casing of the winding mechanism provides both practical and esthetic advantages.

From a practical point of view, the protective shell according to the invention makes the leash casing sturdier in the event of knocks or blows on rather fragile plastic material, causing the casing to break, while from the aesthetic point of view the protective shell according to the invention is a kind of cover that can be interchanged with the possibility of different colours and shapes, with all the consequent advantages also from the fashion point of view.

This invention can be applied in the field of accessories for pets, in particular in the sector for retractable leashes of the type with cords or ribbons of a variable length.

BACKGROUND ART

It is known that leashes for pets, typically for dogs but also for other animals, are also made in the retractable form to allow variations in the distance between the animal and its owner and to allow absorption of the stresses and strains caused by the dog, permitting the dog to move away from its owner up to the maximum established distance, which is the maximum length of the cord completely unwound.

It is also known that retractable leashes generally consist of a casing made from plastic material and provided with a grip, inside which is a winding device which makes it possible to adjust the length of the cord, releasing it or retracting it according to requirements by means of the relative control pushbuttons.

The problem that occurs with traditional retractable leashes concerns the fact that the dog is often able to generate a very strong pulling force, as a result of a jerk caused for example by the approach of another dog. This force is sometimes greater than the dog's own weight and can cause the casing of the leash to slip from the owner's hand.

The leash casing can thus fall to the ground or knock against other obstacles, becoming damaged or even completely breaking, making the leash useless. The leash casing is generally damaged at the front, where the cord exit hole is foreseen.

In short, the problem that the protective shell according to the invention wishes to solve springs from the requirement on one hand to be able to protect the leash casing from the possibility of damage if dropped or knocked against something and on the other hand to be able to use an attractive and interchangeable cover according to fashion tastes.

The German utility model DE 20000789 U1 describes a pocket-shaped container designed to enclose a retractable leash, wherein this container is connected to a strap used to fix the container to the body of a person so that a pet can be walked while leaving the hands free.

The German utility model DE 20318127 U1 describes a pocket or holster-shaped container to be connected to the body of a user with a strap, the container being designed to enclose a retractable leash.

The German utility model DE 202007002784 U1 describes a pocket-shaped container designed to enclose a retractable leash, and provided with additional pockets designed to hold a series of accessories.

The containers described in the three German utility models described above provide very limited protection of the retractable leash casing. There is, in fact, a concrete possibility that, as a result of a jerk due to a movement of the dog, the leash casing can slip out of the pocket or holster-shaped container and that the leash, without any protection, can fall to the ground or suffer knocks that could irreparably damage the casing.

DESCRIPTION OF THE INVENTION

The present invention proposes to provide a pet leash of the automatically retractable type provided with a protective shell that is able to create a condition in which the drawbacks mentioned above are eliminated or drastically reduced.

The present invention also provides a retractable pet leash fitted with a protective shell, which is both simple to make and truly effective.

This is achieved by means of an automatically retractable pet leash provided with a protective shell, whose features are described in claim 1.

The dependent claims of the solution proposed herein describe advantageous forms of embodiment of the invention.

The main advantages of this solution concern first of all the use of a protective shell for automatically retractable pet leashes that can avoid or reduce the possibility of breakage and thus safeguard the leash, this protective shell consisting of a replaceable element that can be easily fitted on the leash and which thus protects it from knocks.

This element can be made from rubber or particularly soft plastic, and in a preferred embodiment can have a shock-resistant rubber interior and a rigid exterior.

This cover can also be personalised with different shapes, graphics and decorations to increase the aesthetic appeal of the product.

DESCRIPTION OF THE DRAWINGS

Other features and advantages of the invention will become clear on reading the description given below of one embodiment, provided as a non-binding example, with the help of the accompanying drawings, in which.

DESCRIPTION OF A FORM OF EMBODIMENT OF THE INVENTION

Figure 1:
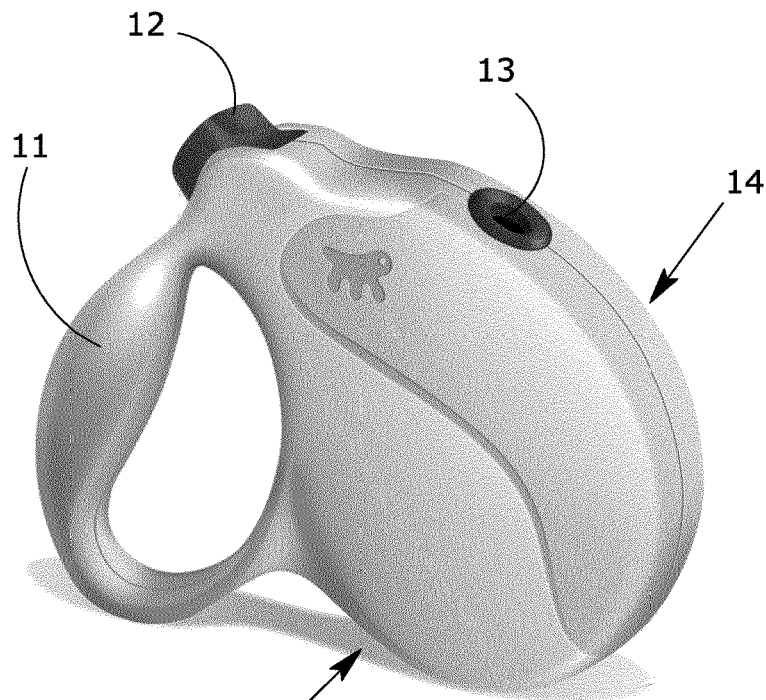
FIG. 1 is a schematic view of a retractable pet leash provided with a protective shell according to the invention, fitted on the casing of the leash in the working position.
Figure 2:
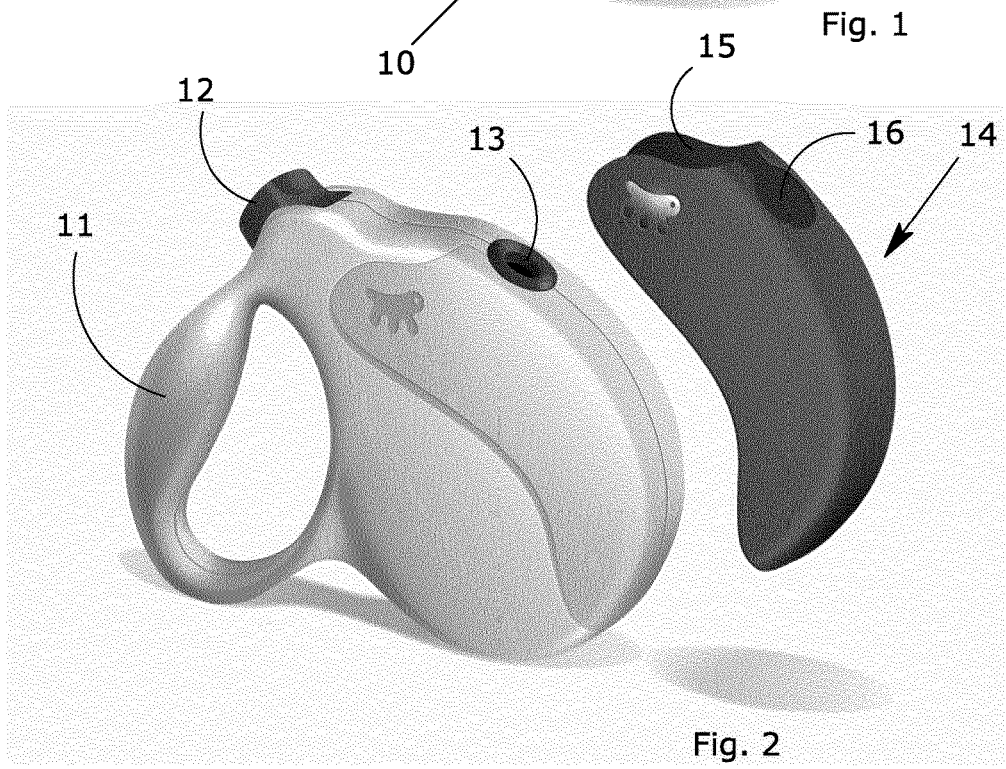
FIG. 2 is a schematic view of the leash in FIG. 1, wherein the protective shell is in the detached position, for example during replacement.

With reference to the accompanying drawings, a retractable leash according to the invention substantially consists of a casing 10 comprising a hand grip 11 and where inside the casing there is a winding device for example of the toothed wheel type intercepted by a traditional brake mechanism operated by a pushbutton 12.

With reference to the accompanying drawings, it can be noted that at the front part of the casing 10, that is to say at the aperture 13 through which the retractable leash cord or ribbon protrudes, a protective element 14 or shell is applied, this shell providing the leash casing 10 with greater resistance in the event of knocks on the rather fragile plastic material that normally cause the casing to break. This protective shell 14 is a kind of cover that can be interchanged, with the possibility of different colours and shapes, with all the consequent advantages also from the fashion point of view.

This protective shell 14, which can prevent or reduce the breakage of the casing 10 and thus protect the entire leash if it is knocked or dropped, substantially consists of a hollow element, which in this specific case comprises an opening 15 which terminates with an enlargement 16 to accommodate the aperture 13 designed for the leash cord or ribbon to pass through.

This shell is a replaceable and interchangeable element that can be easily attached to the leash and which protects it if knocked or dropped.

In order to favour the coupling between the shell 14 and the casing 10 of the retractable pet leash, the casing 10 of the leash is provided with housings while the shell 14 is provided with corresponding ribbing, or vice versa, allowing the reciprocal engagement of the two parts.

The shell or cover 14 can be made from rubber or particularly soft plastic, and in a preferred embodiment can have a shock-resistant rubber interior and a rigid exterior.

This shell or cover 14 can also be personalised with different shapes, graphics and decorations to increase the esthetic appeal of the product.

The invention is described above with reference to a preferred embodiment. It is nevertheless clear that the invention is susceptible to numerous variations which lie within the scope of its disclosure, in the framework of technical equivalents.

The invention claimed is:

1. An automatically retractable pet leash, comprising:
   a casing inside which is a winding device of a cord or ribbon that protrudes from the casing through an aperture on a front portion of the casing;
   a braking mechanism disposed on a back part of the casing and operated by a thumb pushbutton;
   a handle for gripping the leash with one hand disposed on a back part of the casing; and
   a protective shell that substantially covers the front portion of the casing and adjacent side portions of the casing, wherein the protective shell comprises a single hollow element that is shaped to interchangeably fit onto the front and the adjacent side portions of the casing and around the aperture on a front portion of the casing and provide an exit hole for the cord or ribbon, and wherein the protective shell is coupled to the casing by snap-fitting.

2. A leash according to claim 1, wherein said hollow element comprises an opening which terminates with an enlargement around the aperture through which the cord or ribbon of the leash exits.

3. A leash according to claim 1, wherein the protective shell is made from rubber or plastic material.

4. A leash according to claim 1, wherein the protective shell is made internally from rubber and externally from rigid material.

5. A leash according to claim 1, wherein the casing comprises a housing designed to accommodate by snap-fitting at least one coupling or ribbing element on the body of the protective shell in such a way as to hold the protective shell clamped against the casing.

6. A leash according to claim 1, wherein the protective shell comprises a housing designed to accommodate by snap-fitting, at least one coupling or ribbing element on the body of the casing to hold the protective shell clamped against the casing.

* * * * *